United States Patent
Hong et al.

(10) Patent No.: US 10,007,997 B2
(45) Date of Patent: *Jun. 26, 2018

(54) SYSTEM AND METHOD FOR SEGMENTATION OF THREE-DIMENSIONAL MICROSCOPE IMAGES

(71) Applicant: Molecular Devices, LLC, Sunnyvale, CA (US)

(72) Inventors: Dihui Hong, Chester Springs, PA (US); Avrum Cohen, Downingtown, PA (US)

(73) Assignee: Molecular Devices, LLC, San Jose, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/653,140

(22) Filed: Jul. 18, 2017

(65) Prior Publication Data

US 2018/0012362 A1   Jan. 11, 2018

Related U.S. Application Data

(63) Continuation of application No. 15/003,302, filed on Jan. 21, 2016, now Pat. No. 9,754,378.

(51) Int. Cl.
  *G06K 9/34*   (2006.01)
  *G06T 7/11*   (2017.01)

(52) U.S. Cl.
  CPC ...... *G06T 7/11* (2017.01); *G06T 2207/10056* (2013.01); *G06T 2207/30204* (2013.01)

(58) Field of Classification Search
  CPC ........ G06K 9/0014; G06K 9/342; G06T 7/11; G06T 2207/10056; G06T 2207/30204
  See application file for complete search history.

(56) References Cited

U.S. PATENT DOCUMENTS 9,754,378 B2 * 9/2017 Hong ................ G06T 7/11

* cited by examiner

*Primary Examiner* — Phuoc Tran

(57) ABSTRACT

A system and method to segment an image captured from an image capture device of a high content imaging system includes an image acquisition module that receives the image captured by the image capture device. A coarse object detection module develops a coarse segmented image, wherein each pixel of the coarse segmented image is associated with a corresponding pixel in the captured image and is identified as one of an object pixel and a background pixel. A marker identification module selects at least one marker pixel from the pixels of the coarse segmented image, wherein each marker pixel is one of a contiguous group of object pixels in the coarse segmented image that is furthest from a background pixel relative to neighboring pixels of the group. An object splitting module that comprises a plurality of processors operating in parallel that associates each object pixel of the coarse segmented image with a marker pixel, wherein a distance based metric between the object pixel and the marker pixel is less than the distance based metric between the object pixel and any other marker pixel in the coarse segmented image.

20 Claims, 9 Drawing Sheets

SYSTEM AND METHOD FOR SEGMENTATION OF THREE-DIMENSIONAL MICROSCOPE IMAGES

CROSS REFERENCE TO RELATED APPLICATIONS

This present application claims the benefit of Hong, U.S. application Ser. No. 15/003,302, filed Jan. 21, 2016, entitled "System and Method for Segmentation of Three-Dimensional Microscope Images". The entire contents of this application are incorporated herein by reference.

FIELD OF DISCLOSURE

The present subject matter relates to high content image systems, and more particularly, to a system and method to automatically analyze and segment images obtained using such systems.

BACKGROUND

A high-content imaging system (HCIS) may be used to obtain a microscopy image of a biological sample. Such image may include a number of cells against a background field. Further, the HCIS may be used to obtain a series of microscopy images of the biological sample, wherein, for example, each image is obtained using a different focus point. Such series of microscopy images may be combined to develop a three-dimensional view of the biological sample. Such series of microscopy images may also be analyzed to segment and identify a portion of each such image that is associated with a particular cell. Such portions may then be combined to form a three-dimensional view of the particular cell, analyzed further to identify organelles within the three-dimensional cell body, and/or develop three-dimensional statistics of the three-dimensional cell body and/or the organelles therein.

A researcher may want to obtain statistics of cells that are present in the microscopy image or series of microscopy images. Such statistics may include a count of how may cells of a particular cell type are present in the image, the range of sizes (e.g., dimensions, volumes and surface areas) of such cells, the mean, median and mode of the sizes of such cells, how well the cell conforms to particular shape (e.g., sphericity), and the like. Further, the images may be analyzed to identify organelles within cells identified in such images and the statistics of such organelles may also be developed. Before any such statistics can be calculated, cells in the microscopy image must be segmented from the background and also from any debris present in the microscopy image. In addition, images may be analyzed to calculate statistics of spheroids (collections of cells) and also the cells within such spheroids.

Manually identifying centers and boundaries of all cells in an image is time consuming and may lead to fatigue and error on the part of the researcher. The risk of fatigue and error is further exacerbated if the researcher has to analyze a series of images to manually identify a portion of each such image that is associated with a particular cell.

Thresholding, watershed, deformable models and graph-based formulations are the basis for the most commonly used segmentation techniques for microscopic images. Straightforward approaches such as an auto-threshold method may yield poor segmentation results due to the relatively low signal-to-noise ratio and the densely packed objects. A more sophisticated algorithm such as watershed, level sets, or graph based graph cut may produce reasonable results, but may not have throughput that is feasible for three-dimensional analysis because of the complexity of such algorithm and high demands on computational resources.

SUMMARY

According to one aspect a system to segment an image includes a high content imaging system, an image acquisition module, a coarse object detection module, a marker identification module, and an object splitting module. The image acquisition module receives the image captured by an image capture device of the high content imaging system. The coarse object detection module develops a coarse segmentation image, wherein each pixel of the coarse segmentation image is associated with a corresponding pixel in the captured image and is identified as one of an object pixel and a background pixel. The marker identification module that selects at least one marker pixel of each object in the coarse segmentation image, wherein each marker pixel is one of a contiguous group of object pixels in the coarse segmentation image that is furthest from a background pixel relative to neighboring pixels of the group. The object splitting module that comprises a plurality of processors operating in parallel that associates a pixel of a segmented image corresponding to an object pixel with a marker pixel, wherein a distance based metric between the object pixel and the marker pixel is less than the distance based metric between the object pixel and any other marker pixel in the coarse segmentation image.

According to another aspect, a method to segment an image includes the steps of capturing the image with an image capture device of one of a microscope and a high content imaging system, and developing a coarse segmented image. Each pixel of the coarse segmentation image is associated with a corresponding pixel in the captured image and is identified as one of an object pixel and a background pixel. The method includes the additional step of selecting at least one marker pixel from the pixels of each object in the coarse segmentation image, wherein each marker pixel is one of a contiguous group of object pixels in the coarse segmentation image that is furthest from a background pixel relative to neighboring pixels of the group. In addition, the method includes the step of operating a plurality of processors in parallel to associate each pixel of a segmented image corresponding to an object pixel with a marker pixel, wherein a distance based metric between the object pixel and the marker pixel is less than the distance based metric between the object pixel and any other marker pixel in the coarse segmentation image.

Other aspects and advantages will become apparent upon consideration of the following detailed description and the attached drawings wherein like numerals designate like structures throughout the specification.

DETAILED DESCRIPTION

Figure 1:
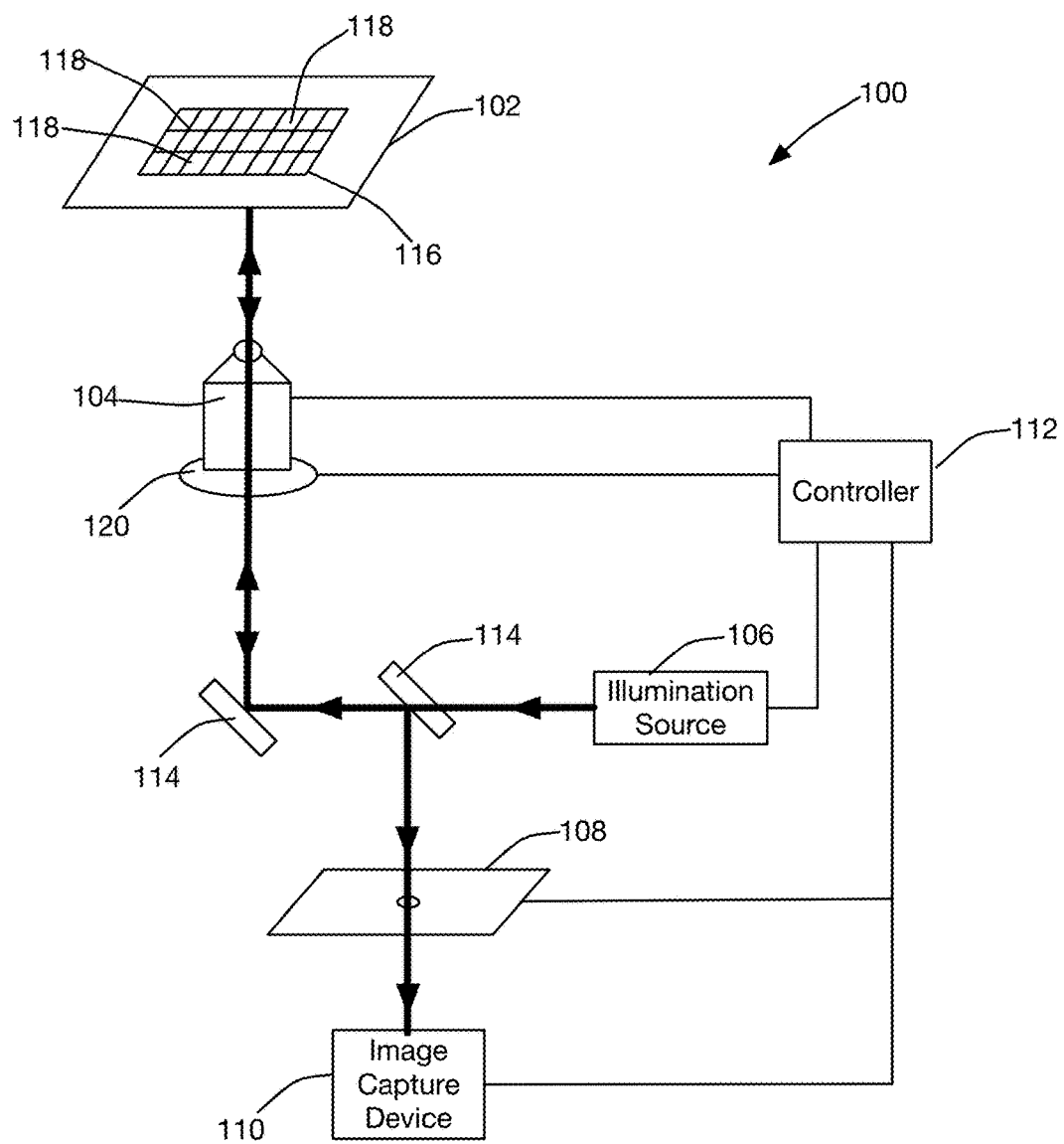
FIG. 1 is a block diagram of a high-content screening system in accordance with the present disclosure.

Referring to FIG. 1, as will be apparent to those who have skill in the art, an HCIS 100 may include an X-Y stage 102, one or more objective lenses 104, one or more illumination sources 106, one or more filters 108, an image capture device 110, and a controller 112. The HCIS 100 may also include one or more mirrors 114 that direct light from the illumination source 106 to a sample tray 116 that may be disposed on the X-Y stage 102, and from such sample tray 116 to the image capture device 110. Typically, the sample tray 116 includes a plurality of wells 118, and samples (for example, biological cells) to be imaged by the HCIS 100 may be disposed in each such well 118.

Although, FIG. 1 shows the light from the illumination source 106 reflected from sample tray 116 reaching the image capture device 110, it should be apparent that additional mirrors (not shown) may be used so that light from the illumination source 106 is transmitted through the sample tray 116 and directed toward the image capture device 110. Further, it should be apparent that in some cases no illumination from the illumination source 106 may be necessary to image the samples in the sample tray 116 (for example, if the samples emit light or if the samples include radioactive components). In some embodiments, light from the illumination source may be transmitted through the samples in the sample tray 116, and the samples refract and/or absorb the transmitted light to produce light that is imaged.

During operation, the sample tray 116 may be placed, either manually or robotically, on the X-Y stage 102. In addition, the controller 112 may configure the HCIS 100 to use a combination of a particular objective lens 104, illumination generated by the illumination source 106, and/or filter 108. For example, the controller 112 may operate positioning devices (not shown) to place a selected objective lens 104 and, optionally, a selected filter 108 in the light path between the sample tray 116 and the image capture device 110. The controller 112 may also direct the illumination source 106 to illuminate the sample tray 116 with particular wavelengths of light. The samples in the sample tray 116 may contain molecules that fluoresce, either naturally occurring molecules, or molecules produced or present within the samples due to treatment. The wavelength illuminating the sample may be the excitation wavelengths associated with such fluorescent molecules, and the imaging capture device will capture only the emission spectrum of such fluorescent materials. One or more wavelengths may used serially or simultaneously to illuminate the same samples and produce images To obtain a series of images at different focal positions, the controller 112 operates a focus mechanism 120 so that the image capture device 110 may obtain in-focus images of the sample disposed in the sample tray 116 at each such focal position.

Thereafter, the controller 112 may operate the X-Y stage 102 so that a well 118 or a portion thereof is in a field of view of the image capture device 110, and actuate the image capture device 110 to capture an image of the well 118 or the portion thereof. The controller 112 may repeatedly operate the X-Y stage 102 and the image capture device 110 in this manner until images have been captured of all of the wells 118 of the sample tray 116 that are of interest. Further, the controller 112 may capture several images of the same well 118 or portion thereof, wherein each such image is captured using a different combination of one of the objective lenses 104, one or more of the filters 108, and illumination generated by the illumination source 106.

Figure 2:
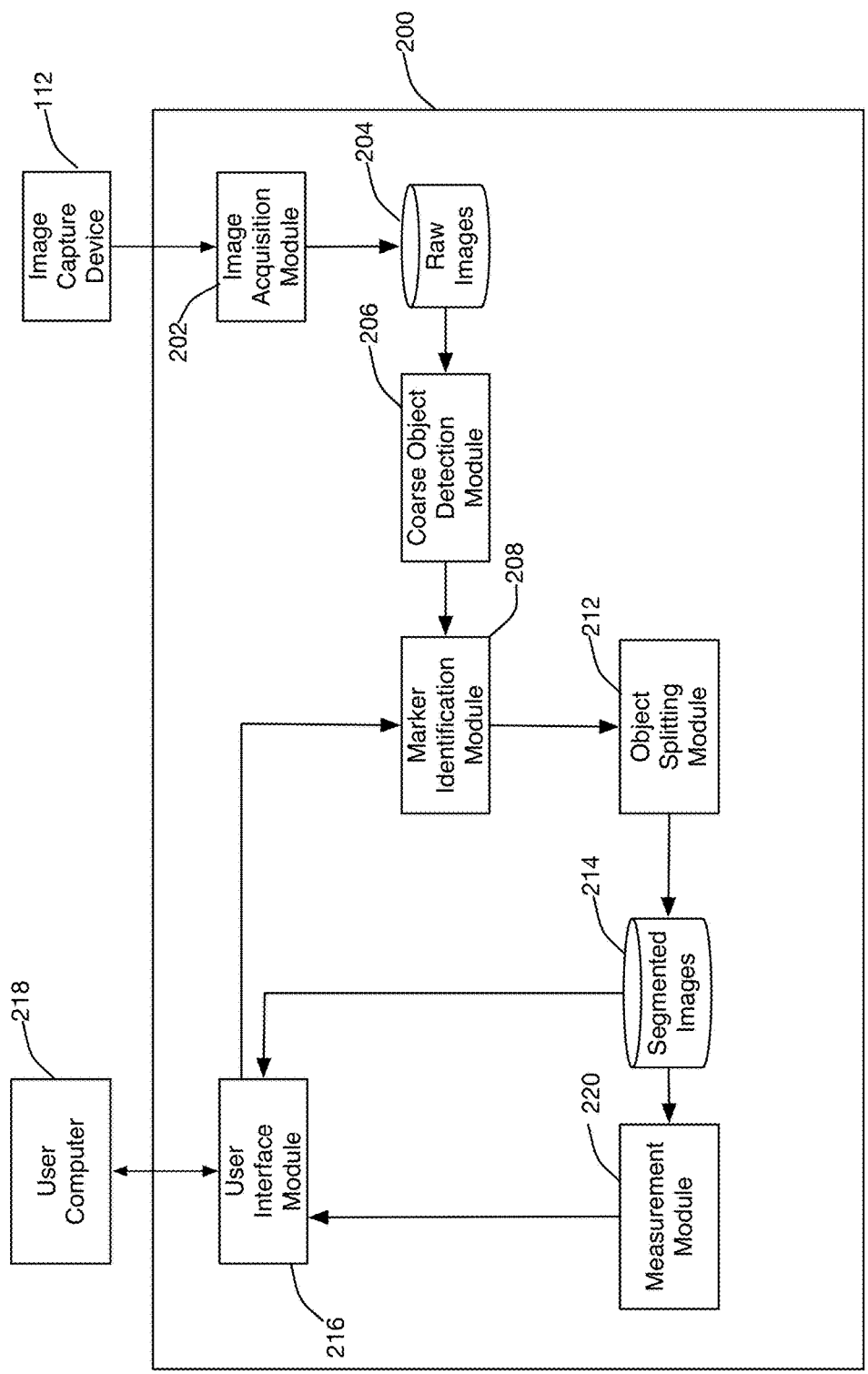
FIG. 2 is a block diagram of an image segmentation system that segments images acquired using the high content screening system of FIG. 1.

Referring to FIG. 2, an image segmentation system 200 includes an image acquisition module 202 that is in communication with the image capture device 112. The image acquisition module 202 directs the controller 112 to capture a plurality of images of a biological sample at various focal positions. In one embodiment, the image acquisition module 202 may direct the controller 112 to operate the focus mechanism 120 and the image capture device 112 to capture a series of between 10 and 150 successive images of the sample. To obtain a low-resolution three-dimensional representation of the sample, the image acquisition module 202 may direct the controller 112 to adjust the focal position by approximately 50 microns between successive images. To obtain a high-resolution three-dimensional representation of the sample, the image acquisition module 202 may direct the controller 112 to adjust the focal position by between approximately 3 microns and 5 microns between successive images. For an even, higher-resolution three-dimensional representation of the sample, the image acquisition module 202 may direct the controller 112 to adjust the focal position by between 0.5 microns and 1 micron between successive images.

The image acquisition module 202 receives the series of successive images from the image capture device 112 and stores such images in a raw images data store 204.

Once at least one image is stored in the raw images data store 204, a coarse object detection module 206 retrieves the image and analyzes such image to identify pixels of such image that are associated with objects.

Figure 3:
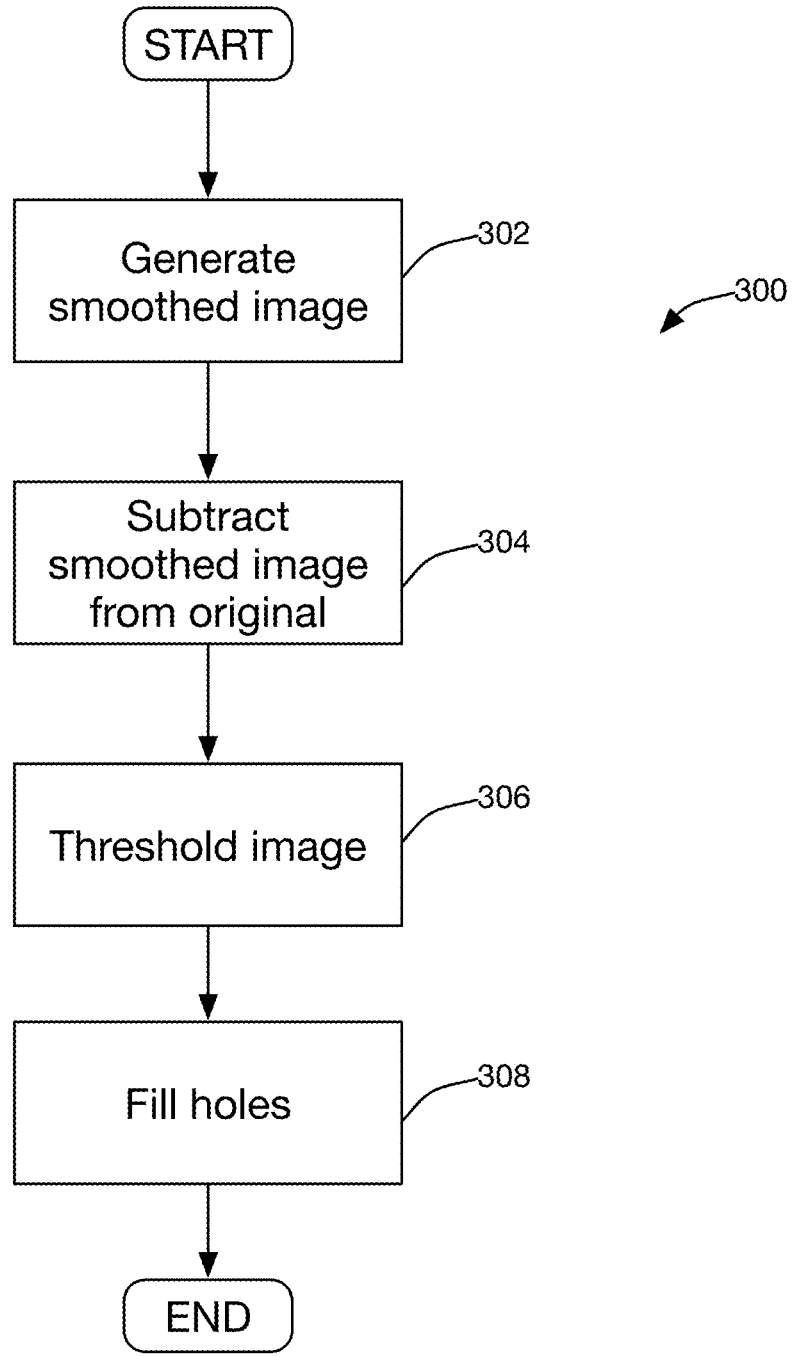
FIG. 3 is a flowchart of steps undertaken by a coarse object detection module of the system of FIG. 2.

FIG. 3 shows a flowchart of the processing undertaken by one embodiment of the coarse object detection module 206. At step 302, the coarse object detection module 206 generates a smoothed image from the retrieved image. In particular, the coarse object detection module convolves the retrieved image with a statistical operator such as a Mean or Gaussian filter. The operator kernel size may be based on predetermined expected object minimum and maximum sizes. In some embodiments the object minimum and maximum sizes may be supplied by a user At step 304, the coarse object detection module 204 subtracts the smoothed image from the retrieved image (i.e., the intensity value of each pixel in the smoothed image is subtracted from the intensity value of a corresponding pixel in the retrieved image). At step 306, the coarse object detection module 204 applies a threshold to the image that results from the subtraction operation at step 304 to develop a coarse segmentation image. In particular, the intensity of each pixel of the image after subtraction is compared to a predetermined threshold value, and if such intensity is greater than the threshold value, the intensity of a corresponding pixel in the coarse segmentation image is set to an intensity value that represents an "on" pixel (e.g., all bits of the pixel set to one). Otherwise the intensity of the corresponding pixel is set to an intensity value that represents an "off" pixel (e.g., zero). Those pixels of the coarse segmentation image that have an intensity value associated with an "on" pixel are pixels that correspond to an object in the retrieved image. Those pixels of the coarse segmentation image that have an intensity value associated with an "off" pixel are pixels associated with a non-object or background portion of the retrieved image. Ideally, such boundary pixels form a continuous closed shape. However, in some embodiments, the coarse object detection module 206 may, at step 308, analyze the coarse segmentation image for any holes (represented by "off" pixels) in such continuous closed shapes, and set the intensities of the pixels associated with such gaps to the value associated with an "on" pixel. In some embodiments, the coarse object module 206 may use a morphology operator such as, for example, a fill holes operator to fill such gaps.

Referring once again to FIG. 2, the retrieved image and the coarse segmentation image generated therefrom are provided to a marker identification module 208. The marker identification module 218 identifies a marker (or seed) pixel associated with each object in the retrieved image.

Figure 4:
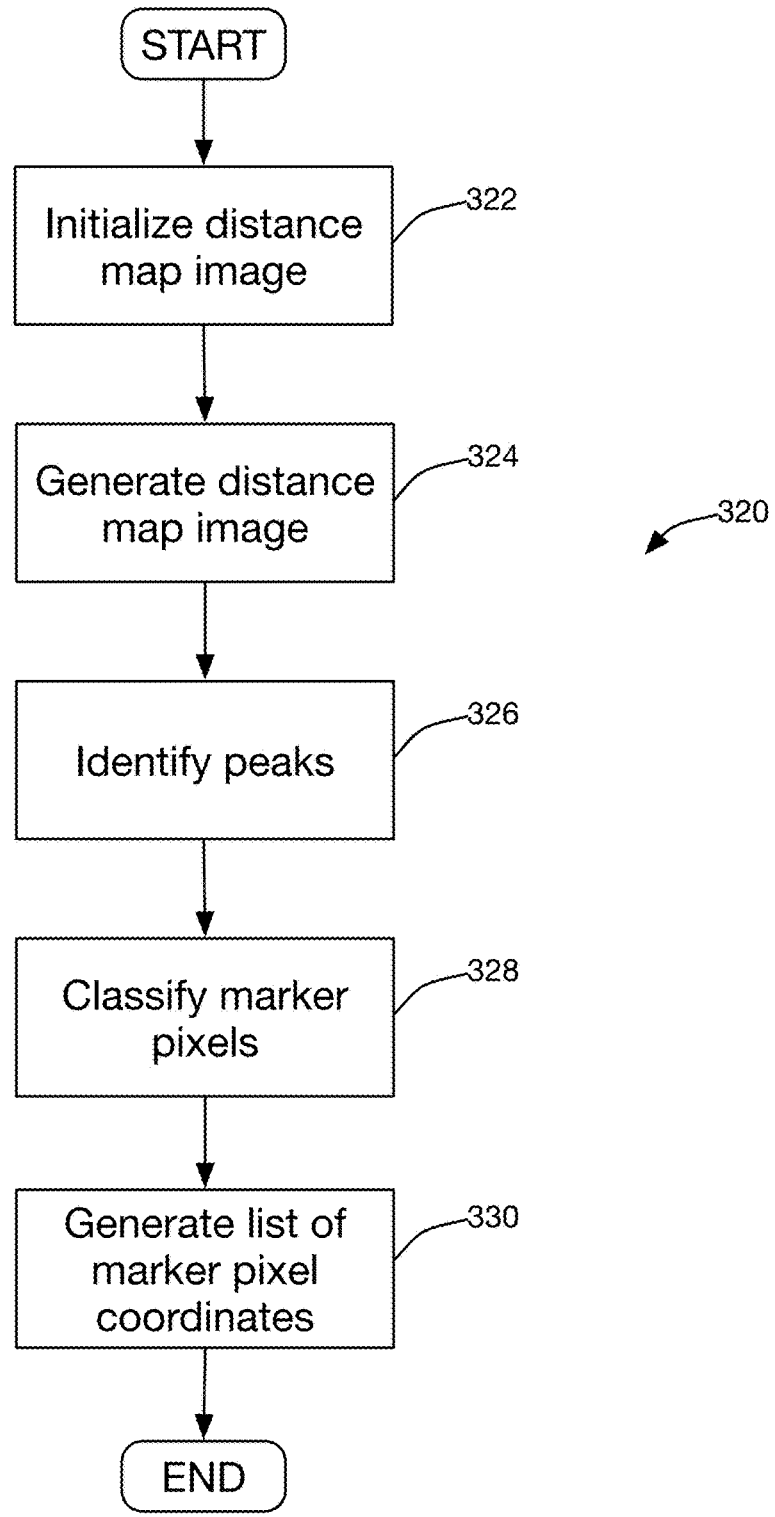
FIG. 4 is a flowchart of steps undertaken by a marker identification module of the system of FIG. 2.

FIG. 4 shows a flowchart 320 of the steps undertaken by the marker identification module 218. At step 322, the marker identification module 208 creates distance map image that has dimensions identical to those of the retrieved image. The marker identification module 208 also initializes the value of each pixel of the new distance map image to zero. At step 324, the marker identification module 208 calculates the Euclidean distance between the coordinates of each pixel of the distance map image and the nearest "off" pixel in the coarse segmentation image (i.e., the shortest distance to a background pixel). This calculated distance is stored as the value of the pixel in the distance map image at such coordinates. That is, the value of each pixel in the distance map image is set to the shortest Euclidean distance between the coordinates of such pixel and another pixel in the coarse segmentation image that represents a boundary pixel. In some embodiments, the marker identification module 208 may create a list of the coordinates of boundary pixels from the coarse segmentation image, and calculate the distances between each pixel of the distance map image and each coordinate in such list. In some embodiments, the marker identification module 208 generates a Vornoi map from the coarse segmentation image. In one embodiment, such distance map image is calculated in accordance with a method described in Felzenwalb et al., "Distance Transforms of Sampled Functions," *Theory of Computing*, (Volume 8, 2012). The entire contents of such papers are incorporated herein by reference. Further, the algorithms described by such papers may be suitably modified to improve the performance thereof.

After the distance map image is created, at step 326, the values of the pixels of the distance map image are analyzed to identify peaks or local maxima (i.e., pixels having a larger intensity value than surrounding pixels) in the distance map image. Such peaks are those pixels surrounded by boundary pixels and are also furthest from boundary pixels. In some embodiments, at step 326, the marker identification module 208 may also apply additional filters to the local peaks to avoid over-segmentation that may occur if all of the peaks were used as marker pixels.

At step 328, certain peak pixels in the distance map are classified as marker (or seed) pixels. In some embodiments, the marker identification module, at step 328, filter the identified peak pixels to remove extraneous peak pixels to avoid over-segmentation. For example, peak pixels that have an intensity value less than a predetermined threshold value may not be considered candidate marker pixels. That is, peak pixels that are at a distance from a closest boundary that is less than a predetermined distance may be eliminated from consideration as candidate marker pixels. Each peak pixel that is not adjacent to another peak pixel or within a predetermined Euclidean distance from one another peak pixel is classified as a marker pixel. If adjacent pixels are identified as peak pixels, only one such peak pixel may be classified as a marker pixel. In some embodiments, if multiple peak pixels are identified that are within a predetermined Euclidean distance from one another (e.g., three pixels), only one of these peak pixels is classified as a marker pixel. If more than one local peak pixels are found within a portion of the retrieved image surrounded by boundary pixels and such local peak pixels are further from one another than the predetermined Euclidean distance, all such local peak pixels are classified as marker pixels. It should be apparent that the distance value associated with each marker pixel represents the approximate radius of the object (or cell) associated with such marker pixel.

At step 330, the marker identification module 208 generates a list of the coordinates of the marker pixels in the distance map image. It should be apparent, that such coordinates also locate corresponding marker pixels in the retrieved image and the coarse segmentation image.

Referring once again to FIG. 2, an object splitting module 212 associates each on or object pixel of the coarse segmentation image with one of the marker pixels.

Figure 5:
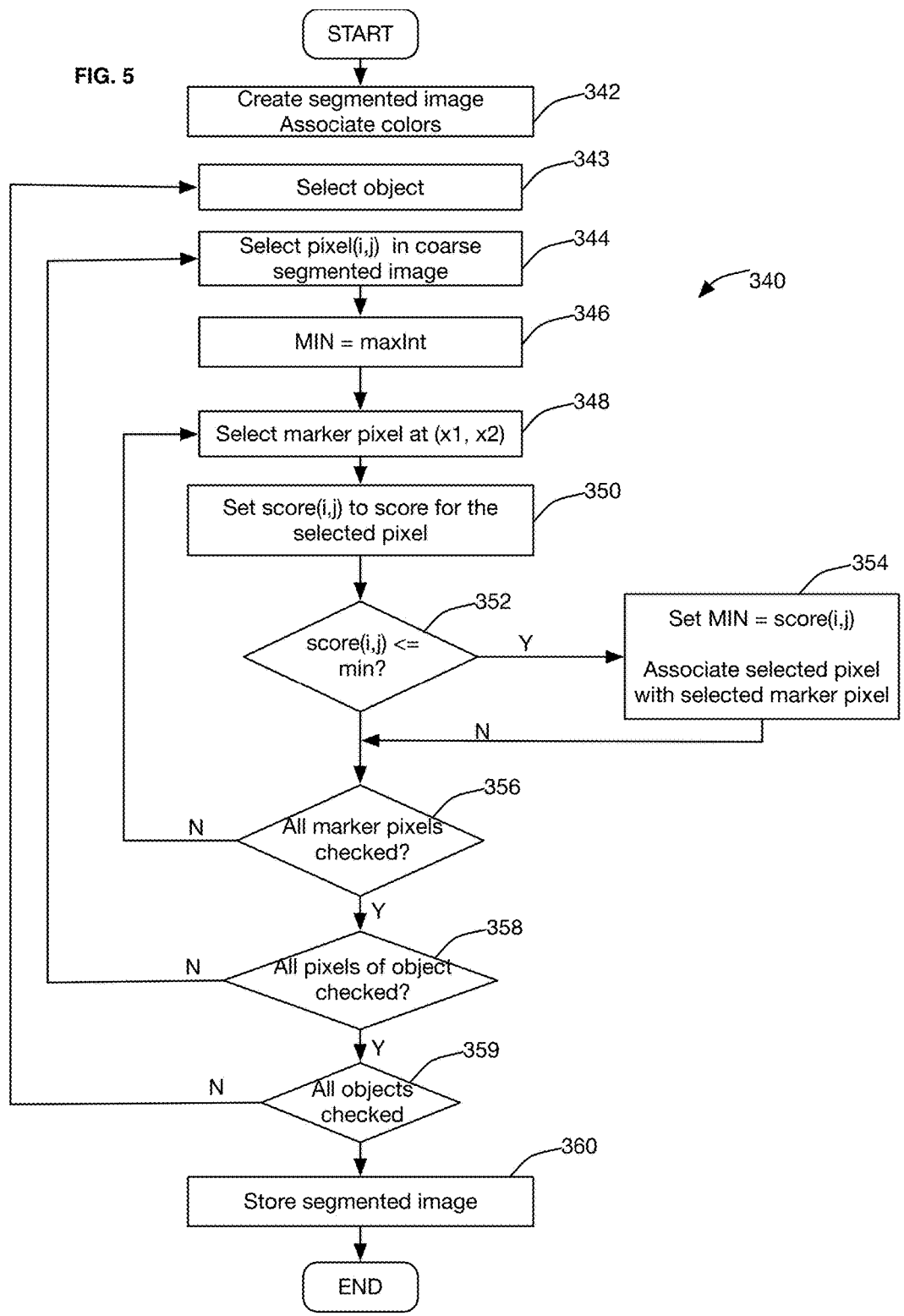
FIG. 5 is a flowchart of steps undertaken by an object splitting module of the system of FIG. 2.

FIG. 5 shows a flowchart 340 of the steps undertaken by the object splitting module 212. At step 342, the object splitting module 212 creates a segment image that is identical in size to the retrieved image. In addition, also at step 342, the object splitting module 212 associates a unique color value with each marker pixel.

At step 343 the object splitting module 212 selects an object (i.e., contiguous collection of on pixels) in the coarse segmented image. At step 344, the object splitting module 212 selects a pixel at coordinates (i,j) of the selected object. At step 346, the object splitting module 212 sets a value of a variable MIN to a maximum integer value. At step 348, the object splitting module 212 selects a marker pixel having coordinates (x1, x2) of the coarse segmentation module associated with the selected object for consideration. At step 350, the object splitting module 212 calculates a score that represents a distance-based metric for the selected pixel in accordance with selected marker pixel in accordance with such metric as follows:

$$\text{score}_{ij} = (1 + \gamma_{ij}) \times \exp\left(-\left(\frac{\|d_{ij}\| - \delta}{\delta^2}\right)\right)$$

The vector $d_{ij}$ of a pixel having coordinates (i,j) to a marker having coordinates (x1, x2) is calculated as:

$$d_{ij} = (x1-i, x2-j,)^T$$

The value $\gamma_{ij}$ is the dot product of each normal $n_{ij}$ with a corresponding normalized gradient vector at each pixel having coordinates (i,j). The normal is calculated from the vector $d_{ij}$ as follows:

$$n_{ij} = \frac{d_{ij}}{\|d_{ij}\|}$$

The value $\gamma_{ij}$ is calculated as follows:

$$\gamma_{ij} = \alpha \times \left(1 + \left\langle \frac{g(i, j)}{\|g(i, j)\|}, n_{ij} \right\rangle\right)$$

The value of the gradient g(i,j) associated with a pixel at coordinates (i,j) indicates a heading toward a local center. In some embodiments, such gradient may be calculated at coordinates (i,j) of the retrieved image. In other embodiments, such gradient may be calculated at coordinates (i,j) of the distance map image. The dot product of the gradient and the normal of the vector from a particular coordinate (i,j) to the marker pixel at coordinates (x1, x2) indicates how close the heading is to pointing toward a marker pixel. The value α is the regulation factor, which is greater than or equal to zero. If the value of the regulation factor is zero, only the distance contributes to the value of the score $\gamma_{ij}$, and as the value of the regulation factor increases, the contribution of the gradient increases. In one embodiment, the value of the regulation factor is set to zero. In other embodiments, such value may be set to other predetermined values in accordance with the characteristics of the biological sample being captured or the characteristics of the retrieved image.

At step 352, the object splitting module 212 compares the value of the $score_{i,j}$ calculated at step 350 and the value of the variable MIN. If the value of the $score_{i,j}$ is less than or equal to the value of the variable MIN, the object splitting module 212, at step 354, sets the value of the variable MIN to the value of the score $score_{i,j}$.

In addition, also at step 354, the object splitting module 212 associates the selected pixel of the segmented image with the selected marker pixel by setting the color value of the selected pixel of the segmented image to the color value associated with the selected marker pixel.

In some embodiments, if the value of the variable $score_{i,j}$ is equal to the value of the variable MIN, which may occur if two marker pixels are at the same distance from the selected pixel of the coarse segmentation image and such selected pixel has been associated with a previously selected marker pixel. In such cases, the object splitting module 212 associates the selected pixel of the segmented image with the selected marker pixel only if the distance from a boundary of the selected marker pixel is greater than the distance from a boundary of the previously selected marker pixel. Thus if multiple marker pixels are at the same distance from a selected pixel of the segmented image, the selected pixel of the retrieved image is associated with the marker pixel associated with the largest object. As noted above, the distance of the marker pixel from a boundary pixel is correlated with the size of the object specified with the marker pixel and the boundary pixel. After step 354, the object splitting module 212 proceeds to step 356.

If at step 352, the object splitting module 212 determines that the value of the variable $score_{i,j}$ is not less than or equal to the value of the variable MIN, then at step 356, the object splitting module 212 checks whether the selected pixel of the selected object specified by the coarse segmentation image has been checked against all of the marker pixels associated with such object. If so, the object splitting module 212 proceeds to step 358. Otherwise, the object splitting module 212 returns to step 348 to select another marker pixel.

At step 358, the object splitting module 212 determines if all of the pixels associated with the selected object of the coarse segmentation image have been associated with a marker pixel. If there are pixels that remain to be associated, the object splitting module 212 proceeds to step 344 to select another pixel of the segmented image to assign. Otherwise, the object splitting module 212 proceeds to step 359. At step 359, the object splitting module 212 determines if all of the objects of the coarse segmentation image have been checked, and if so the object splitting module, at step 360, stores the segmented image in a segmented image data store 214 (FIG. 2). Otherwise, the object splitting module proceeds to step 343 to select another object.

Referring once again to FIG. 2, after segmented image is stored in the data store 214, a user interface module 216 may retrieve such image and display the image on a user computer 218. For example, the user interface module 216 may display a list of available images to a user operating the user computer 218, and the user may select an image from such list for display. In addition, the user may request the measurements or statistics described above be calculated from one or more segmented images. In response, a measurement module 220 retrieves such segmented images, calculates the statistics requested by the user, and provides such statistics to the user interface module 216 for display on the user computer 218. The user may also request, via the user interface module 216, that statistics for one or more segmented images be calculated and stored on the user computer 218 and/or transmitted to another system (not shown) for further analysis.

Figure 6:
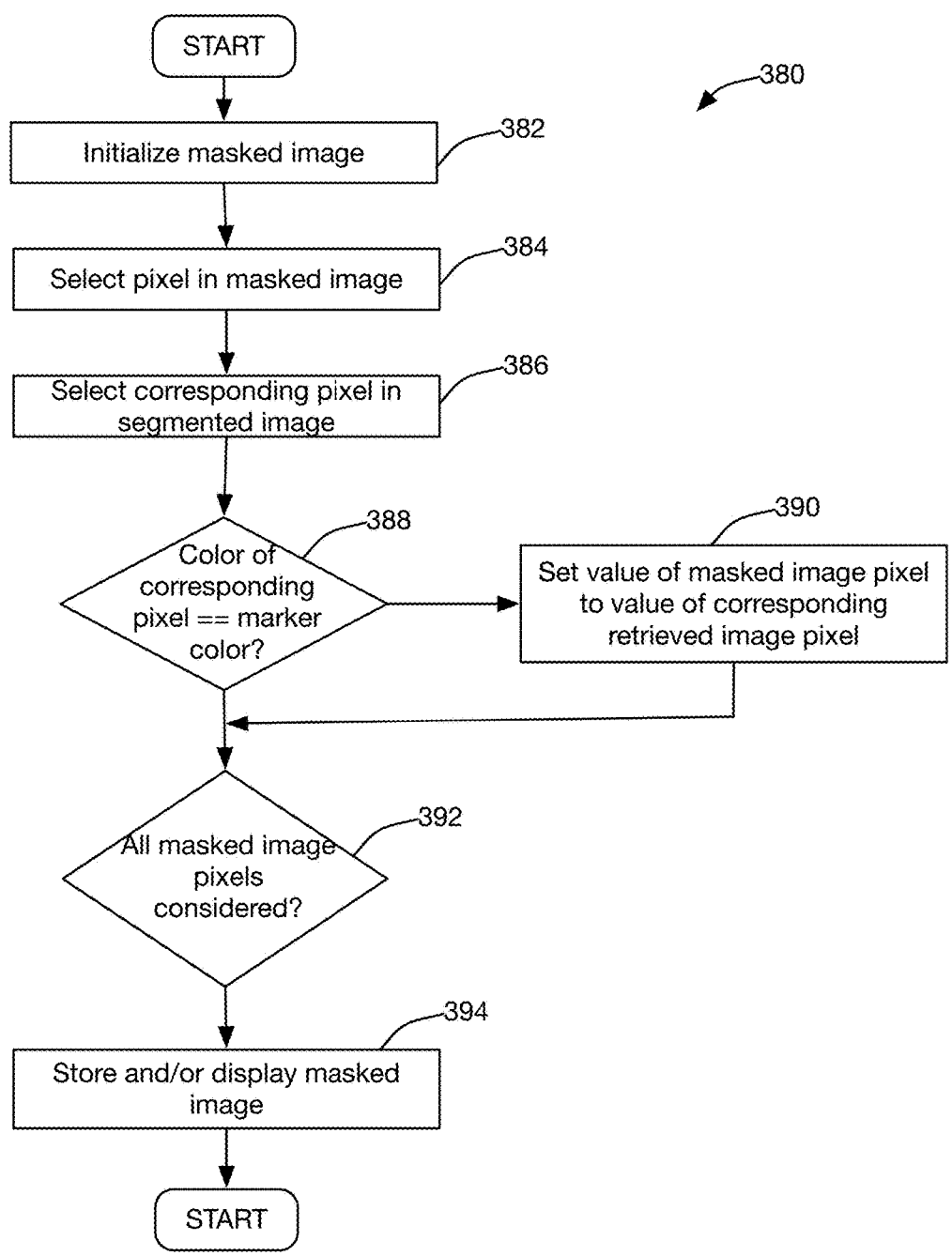
FIG. 6 is a flowchart of steps undertaken by a user interface module of the system FIG. 2 to mask an image retrieved using the high content image system of FIG. 1

In some embodiments, the user interface module 216 may use the segmented image as a mask to isolate particular portions of the retrieved image that are associated with cells of the same size. FIG. 6 shows a flowchart 380 of the steps undertaken by the user interface module 216 to create an image of cells of a particular cell size, wherein the cell size is associated with a color associated with a marker pixel. At step 382, the user interface module 216 creates a masked image that has dimensions identical to those of the retrieved image and initializes the value of each pixel of the masked image to a predetermined background color. At step 384, the user interface module 216 selects a pixel of the masked image. At step 386, the user interface module 216 selects a pixel of the segmented image that has coordinates identical to those of selected pixel of the masked image. At step 388, the user interface module determines if the color value of the selected pixel of the masked image is identical to the color value associated with the particular cell size. If such colors are identical, the user interface module proceeds to step 390. Otherwise, the user interface module 216 proceeds to step 392.

At step 390, the user interface module 216 sets the color value of the selected pixel of the masked image to the color value of a pixel of the retrieved image that corresponds (i.e., having the same coordinates) to the selected pixel of the masked image. Thereafter the user interface module 216 proceeds to step 392.

At step 392, the user interface module 216 determines if all of the pixels of the masked image have been considered. If any pixels remain, the user interface module 216 proceeds to steps 384 to select another pixel of the masked image. Otherwise, the user interface module 218 stores and/or displays on the user computer the masked image, at step 394.

The processing described above to segment cells in a two-dimensional image can also be used to segment cells in a series of images that comprise a three-dimensional representation of biological sample. In particular, the coarse object detection module 206 operates as described above on each image of the series of retrieved images to create a series of coarse segmentation images.

Thereafter, the marker identification module 208 retrieves the series of coarse segmentation images, and creates a list of marker pixels where each element of such list is a three-dimensional coordinate of such marker pixel. Referring once again to FIG. 4, at step 322, the maker pixel identification module initializes a distance map image for each image in the series of coarse segmentation images. At step 324, the marker pixel identification modules 208 determines the Euclidean distance between each pixel of each image in the series of distance map images and a boundary (or "on") pixel in the series of edge-detected images. In particular, the Euclidean distance is calculated in three-dimensions instead of two dimensions. The Euclidean distance calculated for the distance map takes into account any difference in resolution in the X-, Y-, and Z-directions, and scales differences between pixels in the three dimensions appropriately.

Similarly, at step 326, the marker identification module 208 identifies compares neighboring pixels of the series of distance map images in three-dimensions to identify the peak or marker pixels. The classification of marker pixels at step 328 and generation of the marker pixel coordinates at step 330 are undertaken as described above, except in three-dimensions instead of two-dimensions.

After the list of three-dimensional marker pixel coordinates is developed, the object splitting module 212 uses such coordinates to create a series of segmented images. Referring to FIG. 5, the object splitting module 212 at step 342 creates a series of segmented images, for each image in the series of retrieved images. At step 343, the object splitting module 212 selects a three-dimensional object (i.e., a group of pixels that have an on value and are contiguous in three-dimensions) identified in the series of coarse segmentation images. At step 344, the object splitting module 212 selects a pixel having coordinates (i,j,k) of the selected object, for example, by considering each image of the series of images one at a time. Steps 346 and 348 are undertaken as described above. At step 350, the score between the selected pixel and selected marker pixel are calculated in three-dimensions rather than two-dimensions. In particular, a score of a pixel having coordinates (i, j, k) is calculated with respect to each marker pixel having coordinates (x1, x2, x3). In particular, the score may be calculated as follows:

$$\text{score}_{ijk} = (1 + \gamma_{ijk}) \times \exp\left(-\frac{\|d_{ijk}\| - \delta}{\delta^2}\right)$$

Where the vector $d_{ijk}$ is:

$d_{ijk} = (x1-i, x2-j, x3-k)^T$

A normal $n_{ijk}$ is calculated as follows:

$$n_{ijk} = \frac{d_{ijk}}{\|d_{ijk}\|}$$

The value $\gamma_{ijk}$ is the result of a dot product of each normal and a corresponding normalized gradient vector of each pixel:

$$\gamma_{ijk} = \alpha \times \left(1 + \left\langle \frac{g(i, j, k)}{\|g(i, j, k)\|}, n_{ijk} \right\rangle\right)$$

As noted above value of the gradient g(i,j,k) associated with a pixel at coordinates (i,j,k) indicates a heading toward a local center. In some embodiments, such gradient may be calculated at coordinates (i,j,k) of the retrieved image. In other embodiments, such gradient may be calculated at coordinates (i,j,k) of the distance map image. The dot product of the gradient and the normal of the vector from a particular coordinate (i,j,k) to the marker at coordinate (x1,x2,x3) indicates how close the heading is to pointing toward a marker pixel. The value α is the regulation factor, which is greater than or equal to zero. If the value of the regulation factor is zero, only the distance contributes to the value of the score $\gamma_{ijk}$, and as the value of the regulation factor increases, the contribution of the gradient increases. In one embodiment, the value of the regulation factor is set to zero. In other embodiments, such value may be set to other predetermined values in accordance with the characteristics of the biological sample being captured or the characteristics of the retrieved image.

The distance calculation undertaken in developing the score at step 350 may consider the resolution of the series of images in the X-, Y-, and Z-dimensions. For example, in some embodiments, the resolution in the Z-dimension (i.e., resolution between planes of the series of images) may be different than in the X- and Y-dimensions. Steps 352-359 are undertaken as described above, and at step 360, the object splitting module 212 stores the series of segmented images in the segmented images data store 214.

The measurement module 220 is also adapted to calculate statistics (such as volume, and the like) from the series of segmented images that represent three-dimensional bodies. Each one of the series of segmented images may be used as described above as a mask for a corresponding one of the series of retrieved images to isolate cells of a particular size as described in connection with FIG. 6 above.

Figure 7:
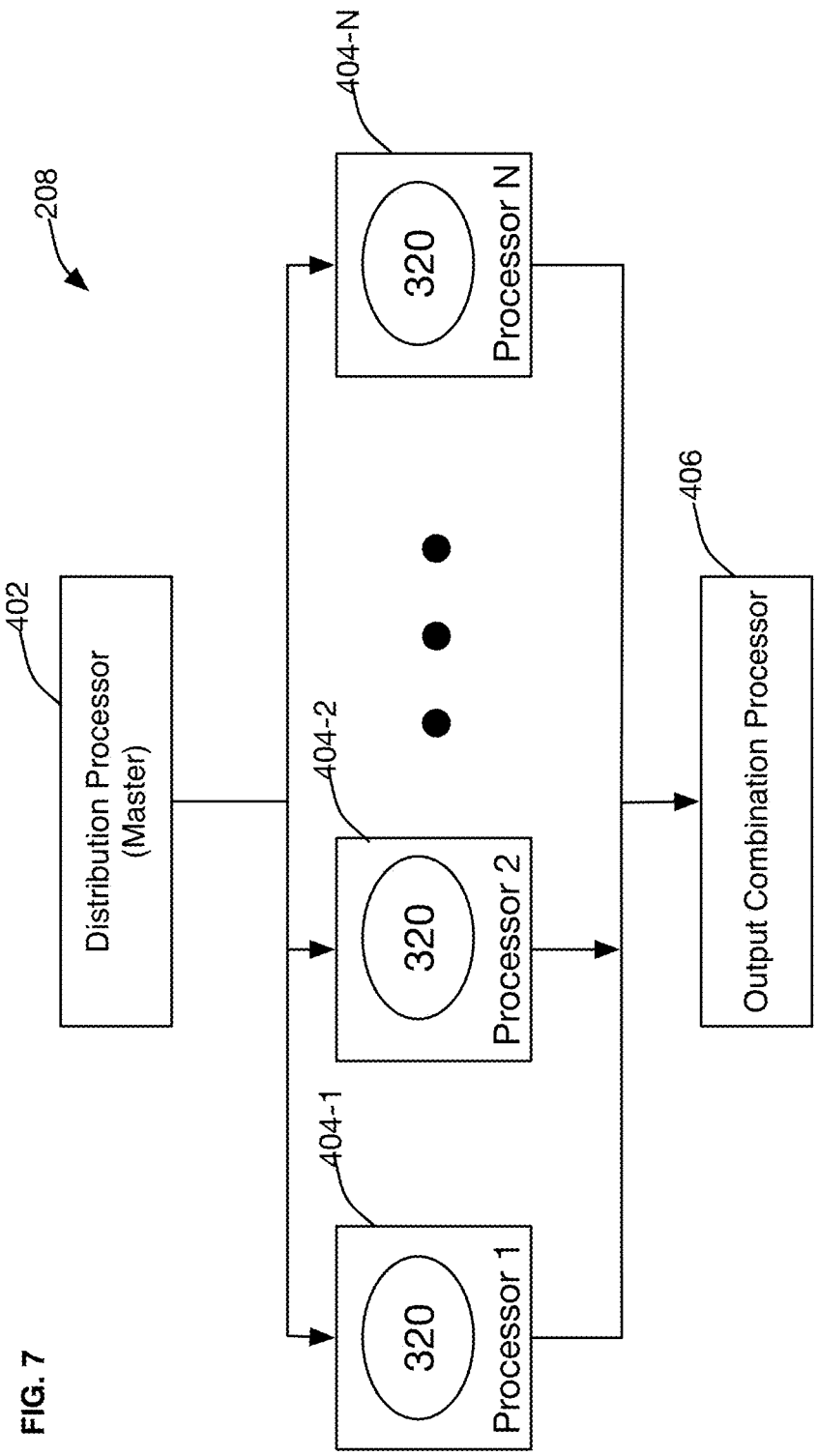
FIG. 7 is a block diagram of a parallel processor implementation of the marker identification module of FIG. 2.

Referring to FIG. 7, an embodiment of the marker identification module 208 uses multiple parallel processors and/or multiple cores of a processor operating in parallel. A master processor 402 receives a coarse segmentation image, a series of coarse segmentation images, or a list of boundary pixels from the coarse object detection module 206. The master processor 402 supplies the coarse segmentation image and assigns a portion of the distance map image (or series of distance map images) to each one of a plurality of processors 404-1, 404-2, . . . , 404-N. In some embodiments, the portion of the distance map image assigned to each processor 404 is a sub-image thereof, and may be represented by starting and ending coordinates of such sub-image. In other embodiments, if a series of distance images to be created, the master processor 402 may assign to each processor 404 one of the series of distance images, or even a sub-image of such distance image. Each processor 404 undertakes the steps 322 through 330 of the flowchart 320 (FIG. 4) based on the portion of the distance image(s) assigned thereto and transmits the list of marker pixel coordinates generated thereby to an output combination processor 406. The output combination processor 406 receives the marker pixel coordinates and combines such coordinates into a master list of marker pixel coordinates. After marker pixel coordinates have been created by analyzing entire the distance map image or series of distance map images, the master list of marker pixel coordinates is provided to the object splitting module 212. In some embodiments, the processor 402 may assign portions of the distance map to the processors 404, receive from the processors 402 the marker pixel coordinates developed thereby, and combine such marker pixel coordinates into a master list of marker pixel coordinates. In such embodiments, the output combination processor 406 may not be needed.

Figure 8:
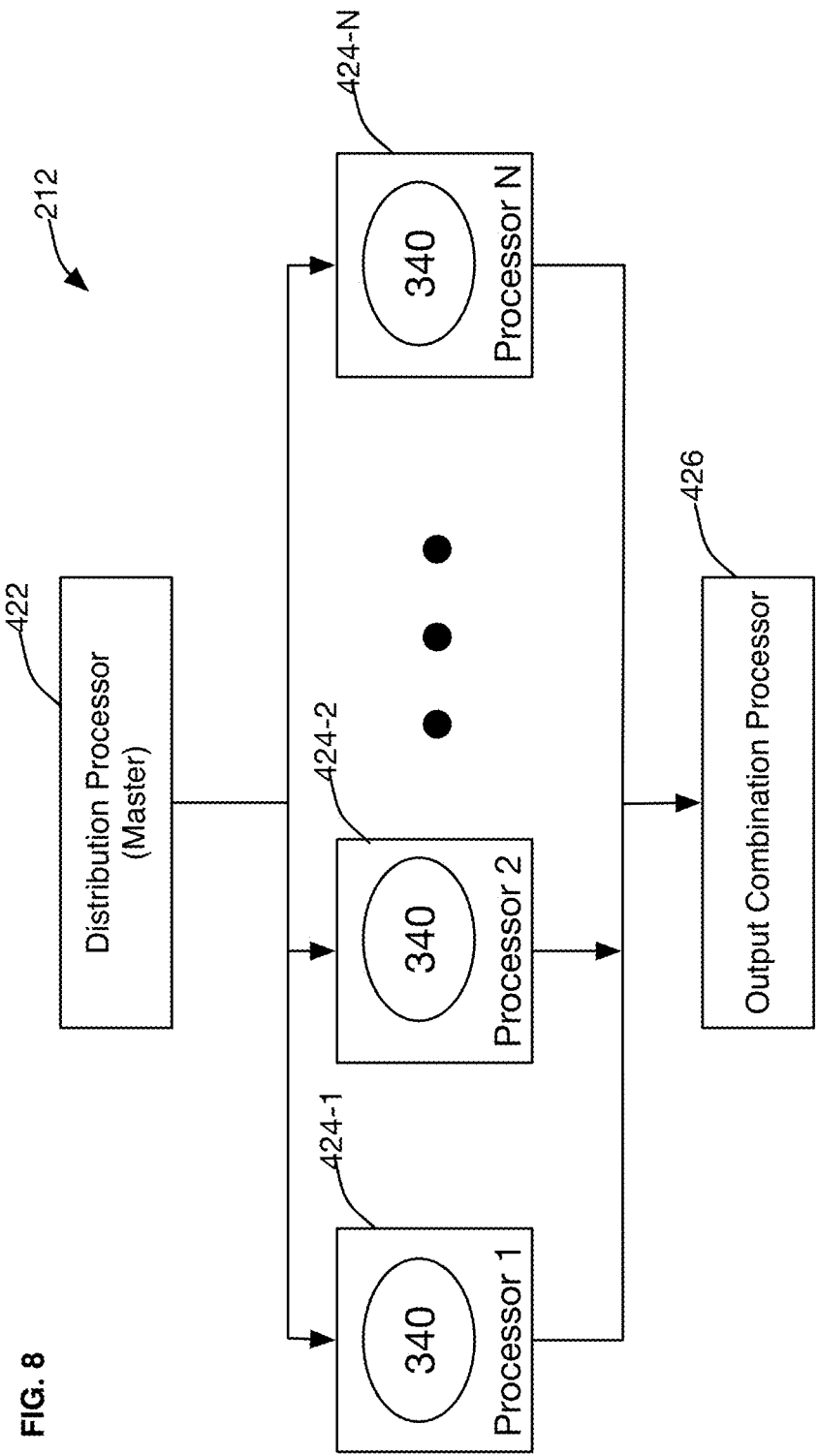
FIG. 8 is a block diagram of a parallel processor implementation of the object splitting module of the system of FIG. 2.

Referring to FIG. 8, an embodiment of the marker identification module 212 uses multiple parallel processors and/or multiple cores of a processor operating in parallel. A distribution processor 422 supplies the list of marker pixel coordinates (or the master list of maker pixel coordinates) to one of a plurality of processors 424-1, 424-2, . . . , 424-N. The distribution processor 422 also assigns a portion of the segmented image (or series of segmented images) to each processor to develop. Each processor undertakes the processing of steps 342 through 360 of the flowchart 340 (FIG. 5) to develop such portion of the segment image (or series of segmented images). However, instead of storing the portion of the segmented image (or series of the segmented images) developed thereby at step 360, each processor provides such developed portion to an output combination processor 426. The output combination processor 426 combines such developed portions into a segmented image (or series of segmented images) and stores the segmented image (or series of segmented images) in the segmented images store 214.

Figure 9A:
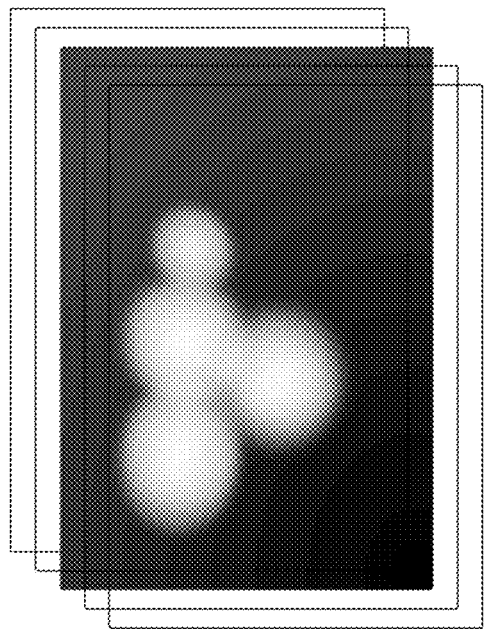
FIG. 9A shows an example of an image captured using the high content imaging system of FIG. 1.
Figure 9B:
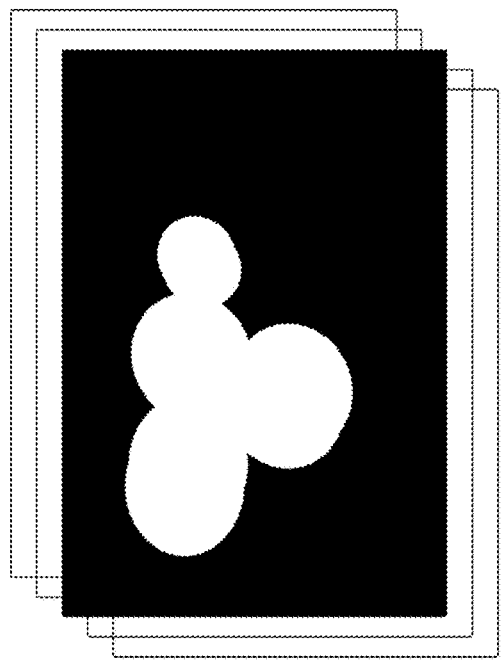
FIG. 9B shows a thresholded image created by the coarse object detection module of the system of FIG. 2.
Figure 9C:
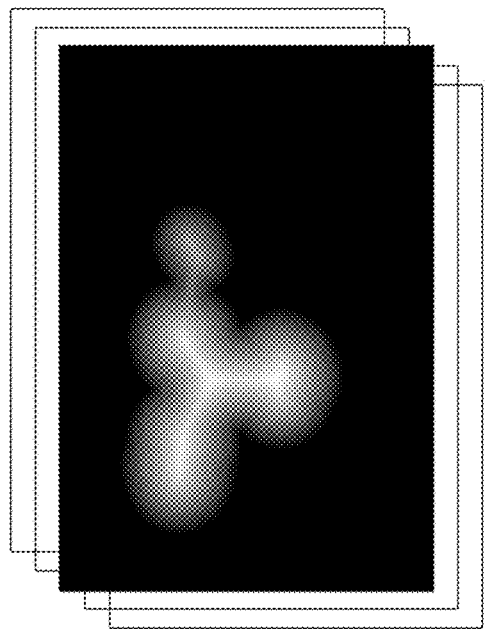
FIG. 9C illustrates a distance map image created by the marker identification module of FIG. 2.
Figure 9D:
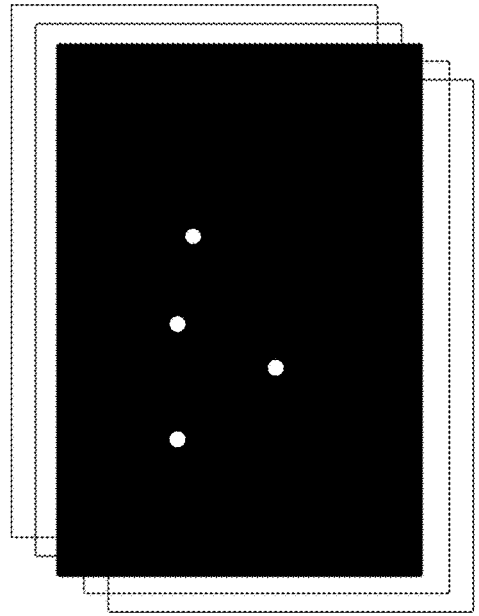
FIG. 9D illustrates classified marker pixels identified from the distance map image of FIG. 9C.

FIG. 9A illustrates an example of a retrieved image. FIG. 9B shows a thresholded image created by the coarse object detection module 206 at step 306. Such thresholded image may be further processed by the coarse object detection module 206 to identify those pixels that lie on the boundary between on and off pixels. FIG. 9C illustrates a distance map image created by the marker identification module 208 at step 324 where the lighter pixels are associated with greater distances from boundary pixels. FIG. 9D illustrates classified marker pixels identified from the distance map image of FIG. 9C.

The image segmentation system 200 described above may be used to segment and identify spheroids in images of biological samples including a group of cells, especially cancerous cells, grown in a 3D medium. The image segmentation system 20 may also be used to segment and identify "organoids" such as a small group of cells of a particular tissue type. Such organoids may be identified without identifying the individual cells using this technique. The system 200 may also be used in succession, for example, first to identify spheroids and then identifying the cells belonging to each spheroid to obtain a measurement of the population of cells that comprise each spheroid measurements. The measurements associated with each cell that comprises the spheroid may also be developed in this manner.

It should be apparent to those who have skill in the art that any combination of hardware and/or software may be used to implement the image segmentation system described herein. It will be understood and appreciated that one or more of the processes, sub-processes, and process steps described in connection with FIGS. 1-8 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-8. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the image acquisition module 202, the coarse object detection module 206, the marker identification module 208, the object splitting module 212, the measurement module 220, and the user interface module 216 of FIG. 3), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A computer implemented system to segment an image, wherein the computer implemented system includes a plurality of processors, comprising:
   an image capture device;
   a computer-based image acquisition module operable on at least one of the plurality of processors that receives an image captured by the image capture device;
   a computer-based coarse object detection module operable on at least one of the plurality of processors that develops from the captured image a coarse segmentation image, wherein object pixels in the coarse segmentation image have an intensity different than background pixels in the coarse segmentation image;
   a computer-based marker identification module operable on at least one of the plurality of processors that develops a distance map image from the coarse segmentation image and uses the distance map image to identify a seed pixel, wherein the seed pixel is associated with a contiguous group object pixels in the coarse segmentation image; and
   a computer-based object splitting module operable on at least one of the plurality of processors that associates a color value with the seed pixel, selects object pixels in the coarse segmentation image associated with the seed pixel, and sets a color value of each selected object pixel to the color value associated with the seed pixel.

2. The computer implemented system of claim 1, wherein the seed pixel comprises a first seed pixel, the selected object pixels comprise first selected object pixels, and the color value comprises a first color value, and the object splitting module further associates a second color value with a second seed pixel, selects second object pixels associated with the second seed pixel, and sets a color value of each one of the selected second object pixels to the second color value.

3. The computer implemented system of claim 1, further comprising a computer-based human interface module operable on at least one of the plurality of processors that generates a masked image from the captured image, wherein a color value of a pixel of the masked image is identical to a color value of a corresponding pixel of the captured image if the corresponding pixel is associated with the seed pixel.

4. The computer implemented system of claim 1, further comprising a computer-based measurement module operable on at least one of the plurality of processors adapted to calculate statistics of the object pixels associated with the seed pixel.

5. The computer implemented system of claim 1, wherein the marker identification module operates on at two of the plurality of processors operating in parallel to develop the distance map image.

6. The computer implemented system of claim 5, wherein the captured image is one of a series of captured images, wherein a focal distance of the image capture device is changed between successive images of the series.

7. The computer implemented system of claim 6, wherein the value of each pixel of the distance map image represents a distance between such pixel and a background pixel along any of three dimensions represented by the series of captured images.

8. The computer implemented of claim 5, wherein the marker identification module assigns a portion of the distance map to develop to each of the plurality of processors.

9. The computer implemented system of claim 1, wherein the coarse object detection module operates on at least two of the plurality of processors, and the coarse object detection module assigns a portion of the coarse segmentation image to develop to the at least two of the plurality of processors.

10. The computer implemented system of claim 1, wherein the marker identification module develops a plurality of candidate seed pixels associated with the contiguous group of object pixels, and select the seed pixel from the plurality of candidate seed pixels.

11. A method to segment an image, comprising:
    capturing an image with an image capture device;
    developing a coarse segmentation image from the captured image, wherein object pixels in the coarse segmentation image have an intensity different than background pixels in the coarse segmentation image;
    developing a distance map image from the coarse segmentation image;
    analyzing the distance map image to identify a seed pixel, wherein the seed pixel is associated with a contiguous group object pixels in the coarse segmentation image;
    associating a color value with the seed pixel;
    selecting object pixels in the coarse segmentation image associated with the seed pixel, and
    setting a color value of each selected object pixel to the color value associated with the seed pixel.

12. The method of claim 11, wherein the seed pixel comprises a first seed pixel, the selected object pixels comprise first selected object pixels, and the color value comprises a first color value, and including the further steps of associating a second color value with a second seed pixel, selecting second object pixels associated with the second seed pixel, and setting a color value of each one of the selected second object pixels to the second color value.

13. The method of claim 11, further including the step of developing a masked image from the captured image, wherein a color value of a pixel of the masked image is identical to a color value of a corresponding pixel of the captured image if the corresponding pixel is associated with the seed pixel.

14. The method of claim 11, further including the step of calculating statistics of the object pixels associated with the seed pixel.

15. The method of claim 11, wherein the captured image is one of a series of captured images, wherein a focal distance of the image capture device is changed between successive images of the series.

16. The method of claim 15, wherein the value of each pixel of the distance map image represents a distance between such pixel and a background pixel along any of three dimensions represented by the series of captured images.

17. The method of claim 11, wherein developing the distance map image includes operating a plurality of processors in parallel.

18. The method of claim 17, wherein developing the distance map image includes assigning a portion of the distance map image to develop to each of the plurality of processors.

19. The method of claim 11, wherein developing the coarse segmentation image comprises operating a plurality of processors and assigning a portion of the coarse segmentation image to develop to each of the plurality of processors.

20. The method of claim 11, wherein analyzing the distance map includes developing a plurality of candidate seed pixels associated with the contiguous group of object pixels, and selecting the seed pixel from the plurality of candidate seed pixels.

* * * * *